March 21, 1944.   A. WARMISHAM   2,344,756
OPTICAL OBJECTIVE
Filed Jan. 15, 1942   2 Sheets-Sheet 1

INVENTOR
A. Warmisham
ATTORNEYS

Patented Mar. 21, 1944

2,344,756

UNITED STATES PATENT OFFICE 2,344,756

OPTICAL OBJECTIVE

Arthur Warmisham, Leicester, England, assignor to Taylor, Taylor & Hobson Limited, Leicester, England, a company of Great Britain Application January 15, 1942, Serial No. 426,911
In Great Britain January 6, 1941

15 Claims. (Cl. 88—57)

This invention relates to optical objectives for photographic or projection or copying or other purposes. Such an objective has hitherto usually been constituted by a system of refracting lenses, and serious difficulties have consequently arisen in obtaining any refined correction of chromatic aberration.

The invention is more particularly concerned with an objective of the kind comprising two parts arranged holosymmetrically and intended more especially for use as a process objective, the two parts usually being similar to one another and symmetrically arranged to give copying at unit magnification. In such an objective the aberrations, other than chromatic aberration, can readily be dealt with by correcting the individual parts for spherical aberration, astigmatism and field curvature, the coma and distortion automatically cancelling out owing to the holosymmetrical arrangement.

One object of the present invention is to provide an improved holosymmetrical objective of this kind, well-corrected for chromatic aberration as well as for spherical aberration, astigmatism and coma and preferably also field curvature and distortion. This object can be achieved by employing curved reflecting surfaces to supply the optical power, the two parts of the objective being individually corrected for first order astigmatism with respect to conjugates bearing substantially the same ratio as the optical powers of the two parts, whilst means are provided for substantially correcting the first order spherical aberration of the whole objective. Such correcting means may consist of a substantially afocal correcting surface, whose deviations from the true plane surface contribute towards correction of the aberrations, and such correcting surface may be constituted by suitably shaping one of the surfaces of a transparent plate through which the light is transmitted.

Another object of the invention is to render such objectives suitable for use with rays outside the range of the visible spectrum.

Figure 1:
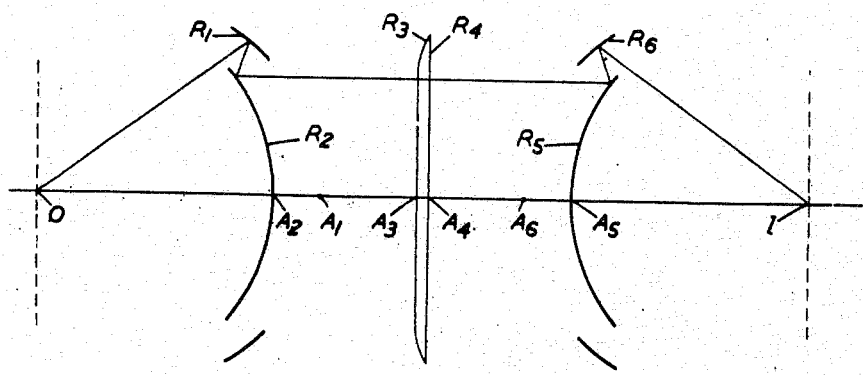
Figure 2:
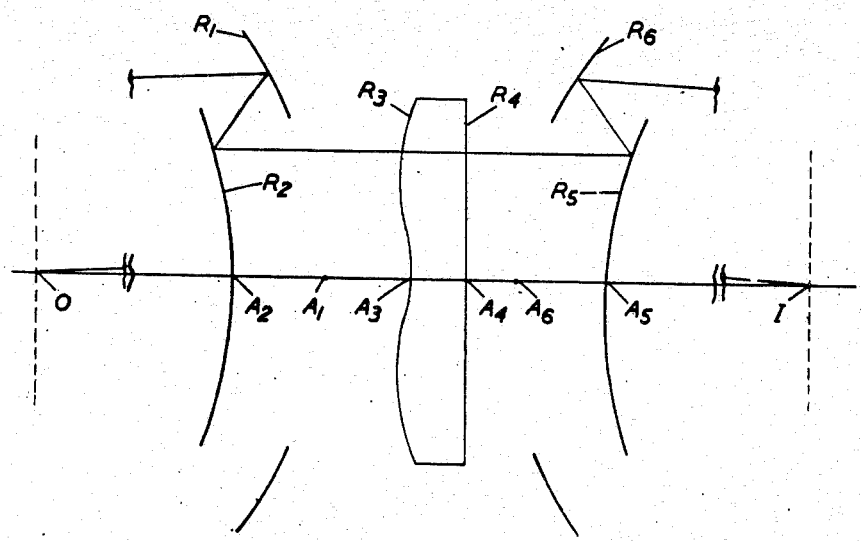
Figure 3:
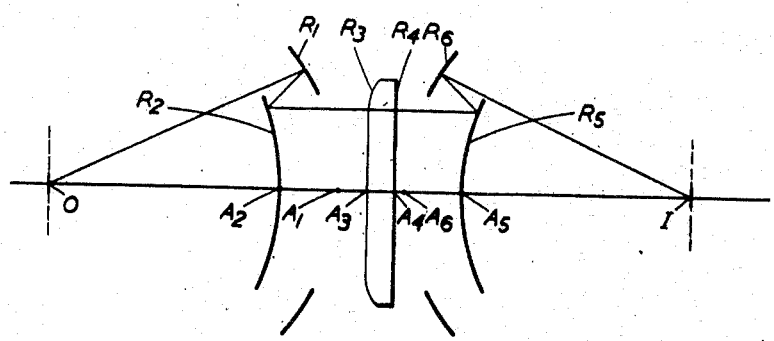
Figure 4:
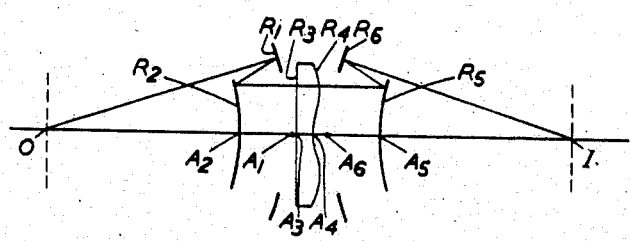
Figure 5:
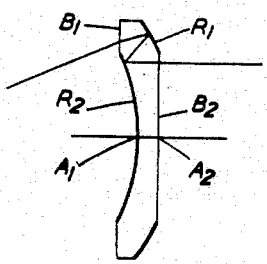

Further objects of the invention will be apparent from the appended claims and from the following description of the accompanying drawings, wherein Figures 1 and 2 show two alternative arrangements of objective according to the invention utilising different forms of afocal correcting surface, Figure 3 shows a modification of the arrangement of Figure 1 having special telecentric properties, Figure 4 shows a modification of Figure 2 suitable for use over a wide range of wave lengths extending beyond the visible spectrum, and Figure 5 illustrates one constructional form of part of the arrangement of Figure 1.

The arrangement illustrated are all of the type arranged for unit magnification and having two similar and symmetrically arranged parts, with a single afocal correcting surface intersecting the optical axis at the point of symmetry. The reflecting surfaces are all spherical surfaces, and the afocal correcting surface is constituted by one of the surfaces of a transparent plate through which the light is transmitted (allowance being made in the symmetry of the two parts for the difference between the refractive indices of air and of the material of the correcting plate).

Each afocal surface may be paraxially afocal (as in Figures 1 and 3), in which case it will consist of a surface of revolution generated by rotation about the $x$-axis (that is the optical axis of the objective) of a curve of the form $$x = Ay^4 + \ldots \text{ higher powers of } y$$

wherein the coefficients $A, \ldots$ are such that the surface will correct for the spherical aberration of the reflecting surfaces. It will usually be preferable however, instead of using a paraxially afocal surface, to make the surface afocal for a selected zone such that the chromatic difference of spherical aberration is reduced to a minimum, (as shown in Figures 2 and 4). This necessitates that the surface shall have slight curvature at its axial point, and the equation of the generating curve will become $$x = \tfrac{1}{2}\tfrac{y^2}{b} + Ay^4 + \ldots \text{ higher powers of } y$$

wherein $b$ is a constant large in comparison with the equivalent focal length of the objective. For such a surface to be substantially afocal for a selected zone of radius $h$, the quantities $b$, $A$ and $h$ should be inter-related by the equation $$b = -\frac{1}{4Ah^2}$$

The curvatures of the individual surfaces of the objective are preferably so chosen as to give a substantially flat field. The individual halves are corrected at least to the first order for spherical aberration and astigmatism with respect to the point of symmetry, and the coma and distortion cancel out automatically owing to the symmetrical arrangement.

In the arrangement of Figure 1, the objective comprises four spherical mirrors and one afocal correcting plate. The light from the object at O, after reflection at one of the mirrors $R_1$ which is annular and concave and then again at a second mirror $R_2$ which is convex, passes through the correcting plate $R_3R_4$ and is then reflected at the third mirror $R_5$ which is convex, and again at the fourth mirror $R_6$, which is annular and concave, whence it passes to the image plane I. The four mirrors all have the same radius of curvature and are symmetrically arranged with respect to the point of intersection $A_3$ of the front surface $R_3$ of the correcting plate with the optical axis. The correcting plate consists of a thin glass plate with its rear surface $R_4$ plane and its front surface $R_3$ in the form of a paraxially afocal correcting surface deformed from the true plane to an extent sufficient to correct for the algebraic sum of the first order spherical aberrations of the four mirrors. The vertices of the six surfaces are indicated respectively by $A_1A_2 \ldots A_6$.

The field curvature aberration of the first mirror $R_1$ is balanced by that of the second $R_2$, and likewise that of the third $R_5$ by that of the fourth $R_6$. The coma and distortion of the first mirror $R_1$ are balanced by those of the fourth $R_6$ and of the second mirror $R_2$ by those of the third $R_5$. The front half of the objective, comprising the first and second mirrors $R_1R_2$, is corrected for first order astigmatism with respect to the axial point of symmetry $A_3$ of the objective, as also is the rear half comprising the third and fourth mirrors $R_5R_6$. The objective is thus corrected for all aberrations for object and image planes OI so chosen that the paraxial rays in the space between the second and third mirrors $R_2R_5$ are parallel to the axis.

Numerical data for one example of this arrangement are given in the following table, wherein $R_1 R_2 \ldots$ represent the radii of curvature of the individual surfaces counting from the front (the positive sign indicating that the surface is convex to the front and the negative sign that it is concave thereto), and $D_{12} D_{23} \ldots$ represent the axial distances between the vertices of such surfaces (the minus signs for $D_{12}$ and $D_{56}$ indicating that the second and sixth surfaces are respectively in front of the first and fifth surfaces). The equation to the generating curve is given instead of the radius of curvature for the correcting surface $R_3$, the surface being generated by rotation of such curve about the optical axis. The equation is given in Cartesian coordinates with origin at the vertex of the surface and with the $x$-axis coincident with the optical axis.

*Example I*

| Radius | Thickness or air separation | Refractive index $n_D$ |
|---|---|---|
| $R_1 = -1.0$ | | |
| $R_2 = -1.0$ | $D_{12} = -.25$ | |
| $R_3x = +.434y^4 + \ldots$ higher powers of $y$. | $D_{23} = .75$ | |
| $R_4 = \infty$ | $D_{34} = 0$ | 1.5 |
| $R_5 = +1.0$ | $D_{45} = .75$ | |
| $R_6 = +1.0$ | $D_{56} = -.25$ | |

Equivalent focal length, $-2.0$.
Distance of object plane O in front of $R_1$, 1.5.
Distance of image plane I behind $R_6$, 1.5.

It will be noticed that in this example the thickness of the correcting plate is assumed to be negligibly small. The example has been calculated with a paraxially afocal surface, but in practice this is not wholly satisfactory, since such a surface gives rise to a chromatic difference of spherical aberration. It is preferable in practice to modify the arrangement by making the correcting surface afocal for a selected zone to reduce such chromatic difference to a minimum.

Numerical data for one example of such modification (shown in Figure 2) are given in the following table.

*Example II*

| Radius | Thickness or air separation | Refractive index $n_D$ |
|---|---|---|
| $R_1 = -1.057$ | | |
| $R_2 = -1.181$ | $D_{12} = -.25$ | |
| $R_3x = -.0810y^2 + .4201y^4 +$ higher order terms. | $D_{23} = .47$ | |
| $R_4 = \infty$ | $D_{34} = .15$ | 1.5 |
| $R_5 = +1.181$ | $D_{45} = .37$ | |
| $R_6 = +1.057$ | $D_{56} = -.25$ | |

Equivalent focal length, 9.0.
Distance of object plane O in front of $R_1$, 14.62.
Distance of image plane I behind $R_6$, 14.62.
Radial zone for which $R_3$ is afocal, .31.

Figure 3 shows a modified form of the arrangement of Figure 1, in which the two halves are so arranged that the plane of symmetry coincides with the focal plane of each half, and the two halves are each corrected for astigmatism with reference to a stop position in such plane. Such a double telecentric arrangement behaves like a telescope at unit magnification for distant objects, and the arrangement is especially convenient for use as a copying objective at unit magnification since it has the property that within certain limits the exact position of the objective between the object and image planes is unimportant, correct focussing being obtained for a range of positions of the objective. The following table gives numerical data for one example of objective of this kind, using dense barium crown glass for the correcting plate.

*Example III*

| Radius | Thickness or air separation | Refractive index $n_D$ | Abbé V number |
|---|---|---|---|
| $R_1 = -1.111$ | | | |
| $R_2 = -1.111$ | $D_{12} = -.308$ | | |
| $R_3x = +.3088y^4 +$ higher powers of $y^4$ | $D_{23} = .445$ | | |
| $R_4 = \infty$ | $D_{34} = .161$ | 1.613 | 59.3 |
| $R_5 = +1.111$ | $D_{45} = .345$ | | |
| $R_6 = +1.111$ | $D_{56} = -.308$ | | |

Equivalent focal length, $\infty$.
Distance of object plane in front of $R_1$, 1.560.
Distance of image plane behind $R_6$, 1.560.

The foregoing examples can all be readily modified to incorporate a further feature of the invention according to which the reflecting surfaces are metallic or metallised and the correcting plate is made of a material transparent to a wide range of wave lengths extending well beyond the visible spectrum.

Either aluminium or silver is especially suitable for use for the metallic or metallised surfaces, whilst among suitable materials for the refracting correcting element may be mentioned vitreous quartz, fused silica, crystalline potassium chloride, and crystalline magnesium oxide in the form known as β-MgO. Thus vitreous quartz is transparent over a wide spectral range extending from 2,000 A. to 35,000 A. and a still wider range is obtained with crystalline potassium chloride from 2,000 A. to 210,000 A., whilst both β-MgO and fused silica are suitable for a range covering the visible spectrum and the ultraviolet down to 2000 Å.

Example III above can readily be modified solely by replacing the correcting plate of dense barium crown glass by one of fused silica, which has mean refractive index 1.4585 and Abbé V Number 67.9. The axial thickness of such correcting plate $D_{34}$ should be 1.4585 to give the same air equivalent as the dense barium crown glass plate, and the equation to the correcting surface $R_3$ should be changed to $$x = +.4124\, y^4 + \text{higher powers of } y^2$$

In all other respects the data of Example III remain unchanged. Other materials transparent to different spectral ranges can be utilised in place of the fused silica with corresponding modifications. The reflecting surfaces may consist of metallic reflectors or of metallised glass surfaces, aluminium and silver being suitable metals.

Figure 4 shows another arrangement arranged for unit magnification copying and β-MgO for the correcting plate, the correcting surface of which is made afocal for a selected zone in the manner described with reference to Figure 2. Numerical data for one such example are given in the table below.

Example IV

| Radius | Thickness or air separation | Refractive index $n_D$ | Abbé V number |
|---|---|---|---|
| $R_1 = -.7405$ | | | |
| | $D_{12} = -.206$ | | |
| $R_2 = -.7690$ | | | |
| | $D_{23} = .207$ | | |
| $R_3 = \infty$ | | | |
| | $D_{34} = .071$ | 1.738 | 53.5 |
| $R_4 x = +.054 y^2 - .894 y^4 +$ higher powers of $y^2$ | | | |
| | $D_{45} = .247$ | | |
| $R_5 = +.7690$ | | | |
| | $D_{56} = -.206$ | | |
| $R_6 = +.7405$ | | | |

Equivalent focal length, 5.34.
Distance of object plane in front of $R_1$, .977.
Distance of image plane behind $R_6$, .977.

In this example the object side nodal point is 9.70 behind $R_1$ and the image side nodal point is 9.70 in front of $R_6$.

In all the foregoing arrangements the spherical mirrors have been separated from one another by air gaps, but it will be appreciated that they may, if desired, be arranged in pairs and formed as internally reflecting surfaces, the two surfaces of each pair being on a single piece of transparent material, preferably the same material as is used for the correcting plate or plates. Figure 5 shows by way of example the two reflectors $R_1R_2$ of Figure 1 formed on a single piece of glass, having a plane annular entrance surface $B_1$, a concave spherical annular internally reflecting surface $R_1$, a convex internally reflecting surface $R_2$ within and adjacent to the entrance surface $B_1$, and a plane exit surface $B_2$ within and adjacent to the annular reflecting surface $R_1$. The entrance surface $B_1$ could if desired be spherical and concentric with the axial point O of the object plane, but is preferably plane. A similar piece of glass would be employed for the rear half, turned the other way round, and the internally reflecting surfaces in both halves could be metallised.

The above examples are intended for equal scale copying, but can readily be modified for other usual copying magnifications. Some modifications will also be required in practice to deal with aberrations of higher order than the first, but such modifications will usually involve only slight numerical changes without any material alteration in the arrangement of the system.

It will be appreciated that the above arrangement has been described by way of example only and that the invention may be carried into practice in other ways. Thus it may be convenient in some instances to employ spheroidal mirrors in place of some or all of the spherical mirrors, the deformation of such spheroidal surfaces from the true spheres contributing towards the correction of the aberrations.

What I claim is my invention and desire to secure by Letters Patent is:

1. An optical objective, comprising two holosymmetrically arranged parts (that is, with the two parts geometrically similar but not necessarily identical in scale disposed on opposite sides of a stop position from which they are axially spaced at distances bearing the same ratio as the sizes of the parts) each having curved reflecting surfaces for supplying the optical power, the two parts being individually corrected for astigmatism with respect to the stop position, and a substantially afocal correcting surface located substantially at the stop position for correcting for the spherical aberration of the objective.

2. An optical objective as claimed in claim 1, in which the two parts of the objective consist of equal halves disposed symmetrically with respect to the stop position.

3. An optical objective as claimed in claim 1, in which the curved reflecting surfaces are all spherical.

4. An optical objective as claimed in claim 1, in which the curved reflecting surfaces are all spherical and the afocal correcting surface consists of a surface of revolution generated by rotation about the $x$-axis of a curve (expressed in Cartesian coordinates $x$ $y$) with origin at the vertex of the surface and with the X-axis coincident with the optical axis and of the form $$x = Ay^4 + \ldots \text{ higher power of } y$$

wherein the coefficients A ... are such that the surface will correct for the spherical aberration of the spherical reflecting surfaces.

5. An optical objective as claimed in claim 1, in which the curved reflecting surfaces are all spherical and the afocal correcting surface consists of a surface of revolution generated by rotation about the $x$-axis of a curve (expressed in Cartesian coordinates $x$, $y$) with origin at the vertex of the surface and with X-axis coincident with the optical axis and of the form $$x = \tfrac{1}{2}\tfrac{y^2}{b} + Ay^4 + \ldots \text{ higher power of } y$$

wherein $b$ is a constant large in comparison with the equivalent focal length of the objective and the coefficients A . . . are such that the surface will correct for the spherical aberration of the spherical reflecting surfaces.

6. An optical objective as claimed in claim 1, in which the curvatures of the individual surfaces are such as to give a substantially flat image field.

7. An optical objective comprising two equal and symmetrically arranged halves each having a plurality of spherical reflecting surfaces in axial alignment for supplying the optical power, the two halves being individually corrected for astigmatism with respect to the plane of symmetry, and a substantially afocal correcting surface intersecting the optical axis in the plane of symmetry for correcting for the spherical aberration of the whole objective, the curvatures of the individual surfaces being such as to give a substantially flat image field.

8. An optical objective as claimed in claim 1, in which each part of the objective comprises two curved reflecting surfaces, respectively convergent and divergent.

9. An optical objective as claimed in claim 7, in which each half of the objective comprises two spherical reflecting surfaces having equal radii, one of such surfaces being convex and the other annular and concave.

10. An optical objective as claimed in claim 1, in which the two parts of the objective are so disposed that a principal focus of each part lies at the stop position.

11. An optical objective as claimed in claim 7, in which the two parts of the objective are so disposed that a principal focus of each part lies at the stop position.

12. An optical objective comprising two similar and symmetrically arranged halves each consisting of two spherical reflecting surfaces one convergent and one divergent for supplying the optical power, each half having its focal plane coincident with the plane of symmetry and being corrected for astigmatism with respect to a stop position in such plane, and a substantially afocal correcting surface substantially located in such plane for correcting for the spherical aberration of the objective, the curvatures of the individual surfaces being such as to give a substantially flat image field.

13. An optical objective as claimed in claim 1, in which each reflecting surface is constituted by a metallic or metallised surface, and the afocal correcting surface is formed on a plate transparent over a wide spectral range extending considerably beyond the limits of the visible spectrum.

14. An optical objective as claimed in claim 7, in which each reflecting surface is constituted by a metallic or metallised surface, and the afocal correcting surface is formed on a plate transparent over a wide spectral range extending considerably beyond the limits of the visible spectrum.

15. An optical objective as claimed in claim 12, in which each reflecting surface is constituted by a metallic or metallised surface, and the afocal correcting surface is formed on a plate transparent over a wide spectral range extending considerably beyond the limits of the visible spectrum.

ARTHUR WARMISHAM.